(12) United States Patent
Kinman

(10) Patent No.: US 6,855,254 B1
(45) Date of Patent: Feb. 15, 2005

(54) MAGERLE METAL WASTE RECOVERY PROCESS

(75) Inventor: Riley N. Kinman, Erlanger, KY (US)

(73) Assignee: Shalom Recycling Inc., Newnan, GA (US)

(*) Notice: Subject to any disclaimer, the term of this patent is extended or adjusted under 35 U.S.C. 154(b) by 0 days.

(21) Appl. No.: 10/739,040

(22) Filed: Dec. 19, 2003

(51) Int. Cl.[7] .............................. C02F 3/28; C02F 1/48
(52) U.S. Cl. ...................... 210/603; 210/222; 210/259; 210/913; 210/914; 435/262.5
(58) Field of Search .................. 210/603, 222, 210/223, 252, 259, 912–914; 435/262, 262.5

(56) References Cited

U.S. PATENT DOCUMENTS

| | | | | |
|---|---|---|---|---|
| 4,297,216 A | * | 10/1981 | Ishida et al. ................. | 210/613 |
| 4,396,402 A | * | 8/1983 | Ghosh .......................... | 48/197 |
| 4,409,020 A | | 10/1983 | Holman et al. | |
| 4,416,779 A | * | 11/1983 | Ripl et al. ................... | 210/603 |
| 4,624,417 A | | 11/1986 | Gangi | |
| 4,725,357 A | * | 2/1988 | Downing et al. ........... | 210/611 |
| 5,009,672 A | | 4/1991 | Ruffo et al. | |
| 5,076,927 A | * | 12/1991 | Hunter ......................... | 210/603 |
| 5,137,687 A | * | 8/1992 | Dunson, Jr. .................. | 422/5 |
| 5,232,596 A | * | 8/1993 | Castaldi ...................... | 210/603 |
| 5,514,278 A | * | 5/1996 | Khudenko ................... | 210/605 |
| 5,527,464 A | * | 6/1996 | Bartha et al. ............... | 210/603 |
| 5,587,079 A | * | 12/1996 | Rowley et al. .............. | 210/603 |
| 5,744,041 A | * | 4/1998 | Grove .......................... | 210/602 |
| 6,117,671 A | * | 9/2000 | Yilmaz ........................ | 435/262 |
| 6,203,700 B1 | * | 3/2001 | Rose et al. .................. | 210/602 |
| 6,464,875 B1 | * | 10/2002 | Woodruff ..................... | 210/603 |

FOREIGN PATENT DOCUMENTS

| | | | |
|---|---|---|---|
| JP | 03000199 | * | 1/1991 |
| JP | 08024890 | * | 1/1996 |
| JP | 10227781 | * | 8/1998 |

* cited by examiner

Primary Examiner—Fred G. Prince
(74) Attorney, Agent, or Firm—Richard C. Litman

(57) ABSTRACT

A metal waste recovery process for recovering useful material from a quantity of waste material. The waste material is a composition including oil, metals and organic materials. The first step of the process is to deposit the waste material into a slurry tank and to add water to the waste material to produce a mixable slurry. The slurry is then high energy mixed to evenly distribute the waste material throughout the slurry. The useful metal is then recovered from the slurry using a magnetic separator. The remaining waste material is transferred into an anaerobic reactor where the remaining waste material reacts with anaerobic organisms provided by bacteria in a sludge seed. The anaerobic reaction between the anaerobic organism and the organic materials of the waste material produces recoverable inorganic gases that are removed from the waste material slurry. The recovered inorganic gases are transferred to a storage vessel and compressed.

12 Claims, 2 Drawing Sheets

MAGERLE METAL WASTE RECOVERY PROCESS

BACKGROUND OF THE INVENTION

1. Field of the Invention

The present invention relates to waste processing and recovery of useful products. Specifically, the invention is directed to metal and energy recovery from metal working fluid such as cutting oil waste.

2. Description of the Related Art

Machines are typically used to shape metal objects. For example, a lathe is a machine in which a piece of metal to be shaped is rotated about a horizontal axis and shaped by a fixed tool. Working or shaping a piece of metal results in heat. Specifically, heat is generated at the point of contact between the tool and the metal object to be shaped. To avoid unnecessary wear on tool parts the tool part and/or metal to be shaped are typically cooled using a working fluid. The working fluid is sometimes referred to as a metal working fluid or cutting oil. Such fluids both lubricate and cool the tool and metal being shaped.

Cutting or metal working fluids (hereinafter referred to as metal working fluids) typically contain at least one organic or hydrocarbon based lubricant. As the metal is shaped metal shavings are generated and are sometimes carried away with the metal working fluid. The metal working fluid is open to the air and is populated by bacteria from the air and from dirty work surfaces. Bacterial contamination of the metal working fluid can lead to health and safety issues since the metal working fluid can form a spray at the interface between the tool and the metal being shaped. In addition, the bacteria can use the hydrocarbon component of the lubricant in the metal working fluid as a food or carbon source leading to serious degradation in the lubricating properties of the metal working fluid. Eventually, the metal working fluid must be replaced with fresh metal working fluid. In turn, this generates a serious waste disposal problem.

A review of the prior art follows.

U.S. Pat. No. 4,624,417, issued Nov. 25, 1986 to Gangi, describes a process for converting solid waste and/or sewage sludge into a chemical intermediate substrate for production of energy and/or separate non-energy related by-products. The process of this invention integrates technologies for slurry production and material recovery; slurry demineralization and heavy metal recovery; formation and storage of chemical intermediate substrate; its dewatering; its processing into various energy sources such as solid carbon fuel, steam, or methane gas; and/or production of non-energy by-products such as cement board, gypsum fiber board, or agricultural products.

U.S. Pat. No. 5,009,672, issued Apr. 23, 1991 to Ruffo, et al., describes a process for handling solid urban waste ("SUW"). Ferromagnetic material is removed from the SUW and the SUW is subsequently subjected to high-pressure compression inside a screening press or the like, so as to separate biodegradable organic material from the dry material intended to form the combustible material, then subjecting the organic material to a process of anaerobic fermentation to generate a biogas, which can be used directly for producing electric power or for other uses. The residuals of fermentation in the form of humus is refined and screened to recover light materials.

U.S. Pat. No. 4,409,020, issued Oct. 11, 1983 to Holman et al., describes a metal recovery process. Metals such as Co, Ni, Cu and Fe, are recovered from a magnet alloy grinding sludge by: (1) treatment with an organic solvent to remove a major portion of sulfur and oil contaminants, (2) drying, grinding, sizing and magnetic separation to remove a major portion of grinding media contamination, (3) controlled oxidation-roasting to selectively remove residual sulfur and carbon, and (4) gaseous hydrogen reduction to deoxidize metal values.

None of the above inventions and patents, taken either singly or in combination, is seen to describe the instant invention as claimed. Thus a magerle metal waste recovery process solving the aforementioned problems is desired.

SUMMARY OF THE INVENTION

A metal waste recovery process for recovering useful material from a quantity of waste material. The waste material is a composition including oil, metals and organic materials. The first step of the process is to deposit the waste material into a slurry tank and to add water to the waste material to produce a mixable slurry. The slurry is then high energy mixed to evenly distribute the waste material throughout the slurry. The useful metal is then recovered from the slurry using a magnetic separator. The remaining waste material is transferred into an anaerobic reactor where the remaining waste material reacts with anaerobic organisms provided by bacteria in a sludge seed. The anaerobic reaction between the anaerobic organism and the organic materials of the waste material produces recoverable inorganic gases that are removed from the waste material slurry. The recovered inorganic gases are transferred to a storage vessel and compressed.

Accordingly, it is a principal object of the invention to provide a process for recovering useful metals and inorganic gases from a quantity of waste material.

It is another object of the invention to provide a useful material recovery process that reduces the potential for fire hazards associated with waste material from metal grinding processes.

It is a further object of the invention to provide a useful material recovery process that reduces the potential for harmful gas emission.

Still another object of the invention is to provide a useful material recovery process that improves the environment of the metal grinding process.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a process for recovering useful material from a quantity of waste material. The process is used to recover useful metal and gas from a sample of waste material. In particular, the process of the present invention is used to recover useful metal and gas from the cutting oil waste material produced by grinding metal with a Magerle heavy duty grinder. Magerle is Swiss maker of industrial grinding-systems and produces surface grinding machines, grinding centers and profile/creepfeed grinding machines. The process of the present invention, however, may be used to recover metal and gases from any waste material containing such materials.

Figure 1:
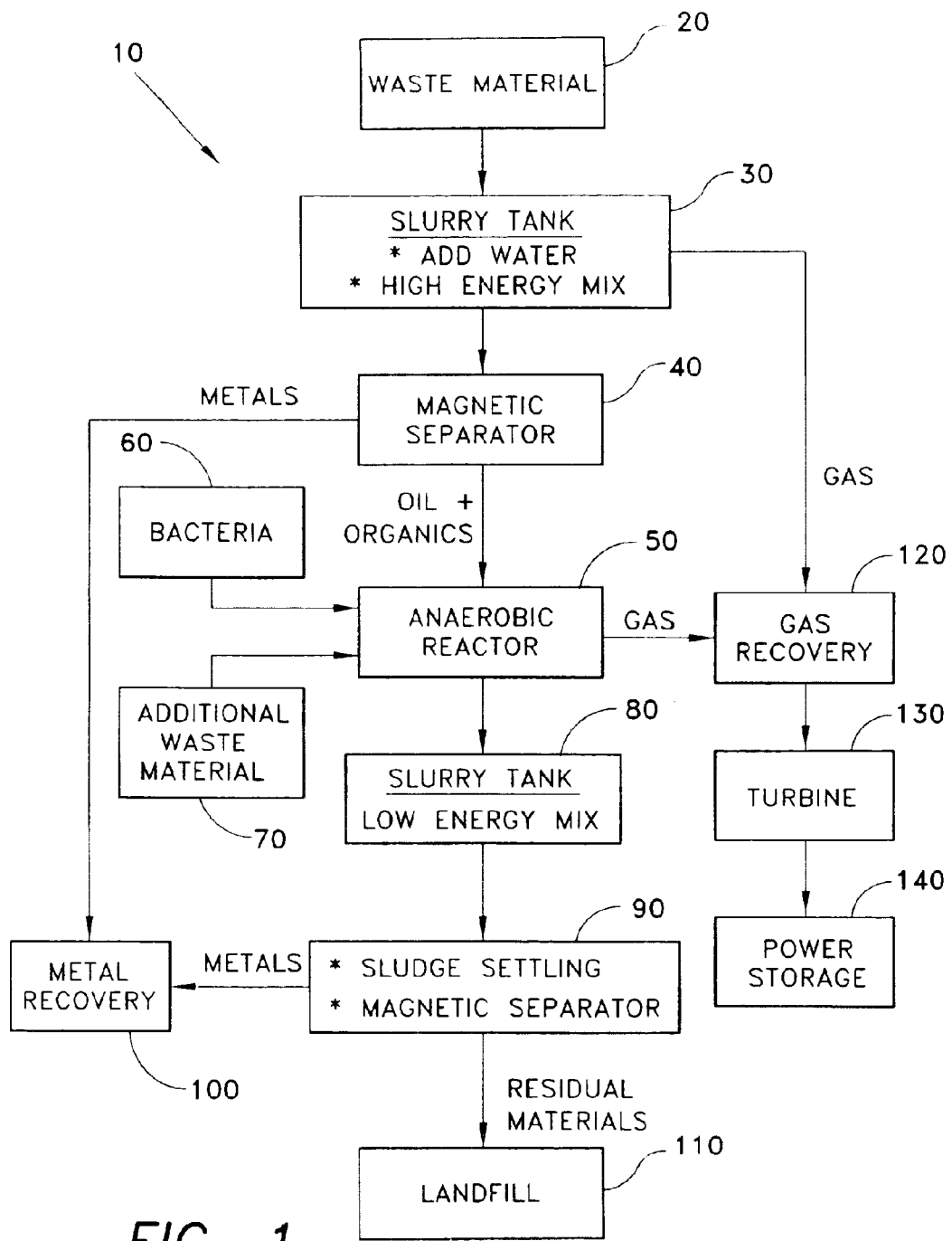
FIG. 1 is a process drawing showing the metal waste recovery process of the present invention.

FIG. 1 is a process drawing showing the metal recovery process 10 of the present invention. The first step in the recovery process 10 is to obtain a quantity of waste material 20. According to certain preferred embodiments of the present invention the waste material 20 comprises used cutting oil from a Magerle grinding machine. When a workpiece is shaped using a grinding machine a metal working fluid is used to lubricate the grinding machine to reduce the heat created due to friction against the workpiece. Metal working fluids typically contain at least one organic or hydrocarbon based lubricant. As the metal workpiece is shaped metal shavings are generated and are sometimes carried away with the metal working fluid. The recovery process 10 recovers the metal from the working fluid waste material.

The waste material 20, which is in the form of a sludge, is then deposited into a slurry tank 30. Water is added to the waste material 20 sludge in a one-to-one ratio to form a slurry. The resultant slurry comprises 50 percent water and 50 percent waste material 20 sludge. The slurry is then high energy mixed inside of the slurry tank 30 until the water and waste material 20 are completely homogenized in the slurry. In the present process, high energy mixing refers to rapidly mixing the slurry at a rate of greater than 100 rpm.

Figure 2:
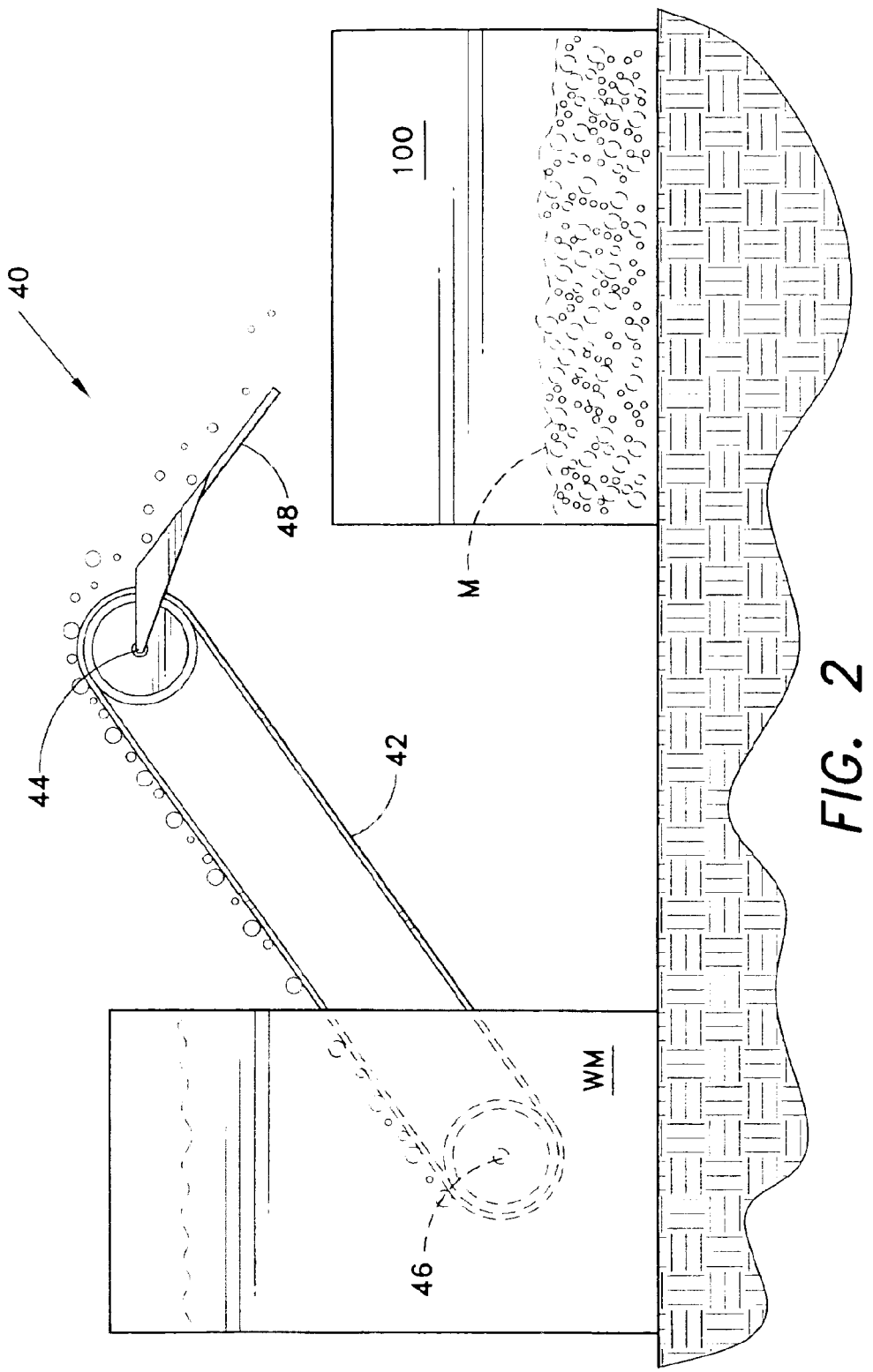
FIG. 2 is a side view of a magnetic metal separator.

The mixed slurry is then transferred to a magnetic separator 40. The magnetic separator 40 is used to recover the useful metals from the waste material 20. FIG. 2 is a side view of the magnetic separator 40. The waste material slurry WM is transferred into a holding tank or hopper. The magnetic separator 40 then removes the useful metal M and transfers the metal M to a metal recovery storage tank 100. The magnetic separator 40 comprises a rotating belt 42 supported at one end by a belt support 44 and a belt drive 46 at an opposite end. The rotating belt 42 is magnetized so the metal M in the waste material slurry WM is drawn to the belt 42. The rotating belt 42 is driven by the belt drive 46. The magnetized belt 42 draws the metal from the waste material slurry WM and then delivers the metal M along the belt 42 and transfers the metal to the metal recovery storage tank 100. The magnetic separator 40 further comprises a delivery attachment 48 secured to the end of the rotating belt 42 for delivering the recovered metal M from the magnetized belt 42 to the storage tank 100.

Once the recovered metal M is transferred to the recovery storage tank 100, the remaining waste material 20 is transferred into an anaerobic reactor 50. The remaining waste material 20 comprises the cutting oil, water and the organic materials of the waste material 20. At this point substantially all of the metal M has been removed from the waste material 20 slurry and only the liquids are transferred into the anaerobic reactor 50. The anaerobic reactor 50 is used to separate gases from the waste material 20 slurry. The anaerobic reactor 50 uses bio-chemical and physical reactions to create inorganic gases. A sludge seed 60 is added into the remaining waste material 20. The sludge seed 60 contains bacteria that provides anaerobic organisms. The anaerobic organisms react with the organic and hydrocarbon based compounds in the waste material 20 to create useable, environmentally safe inorganic gases. The gases created by the reaction include, but are not limited to, methane ($CH_4$), carbon monoxide (CO) and carbon dioxide ($CO_2$). The recovered gas is transferred to a gas recovery storage vessel 120.

Once the gas is transferred to the storage vessel 120 it is compressed by a slow vacuum pump. Also, in some instances a small amount of gas is recovered during the high speed mixing of the waste material 20 slurry in the slurry tank 30. This recovered gas is also transferred to the same storage vessel 120 where it is compressed with the recovered inorganic gas. Once the inorganic gases are recovered the residual waste material 20 (the remaining waste material after the metal M and gases have been recovered) is transferred to a landfill 110.

According to one aspect of the present invention, additional waste material 70 created by another industrial process may optionally be treated during the processing of the Magerle waste material 20. The additional waste material 70 may be created by a machine or process that is used in the same facility as the Magerle grinding apparatus. The additional waste material 70 would also comprise a metal working fluid including a cutting oil and recoverable metal. The additional waste material 70 is optionally added to the waste material 20 slurry in the anaerobic reactor 50. Once the original waste material 20 and the additional waste material 70 react with the sludge seed 60 a digested sludge is transferred into a second slurry tank 80. The digested sludge mixture contains metal and some inert materials that cannot be converted by the bacteria in the sludge seed 60. The inert materials include, but are not limited to, silica and cement. The digested sludge is low energy mixed in the second slurry tank 80.

Once the digested sludge is low energy mixed it is transferred to a second magnetic separator 90. The second magnetic separator 90 is identical to the first magnetic separator 40. Any remaining metal M is removed from the digested sludge and transferred to the metal recovery storage tank 100. The residual waste material 20 is then transferred to the landfill 110.

According to one aspect of the present metal recovery process 10 the compressed gas in the gas recovery storage vessel 120 may be used to generate electricity. The compressed gas is transferred to a turbine 130 that burns the gas to produce electric energy. The generated electricity is then transferred to a power storage vessel 140.

According to certain preferred embodiments of the present invention, the materials recovery process 10 will recover a number of metals from the Magerle waste material 20. Table 1 lists the metals in the amounts recovered from a sample of waste material.

TABLE 1

| Element | Amount | Units |
| --- | --- | --- |
| Arsenic | <0.80 | mg/L |
| Barium | <0.80 | mg/L |
| Cadmium | <0.04 | mg/L |
| Calcium | 11.0 | mg/L |
| Chromium | <0.20 | mg/L |
| Copper | <0.08 | mg/L |
| Iron | 1190 | mg/L |
| Lead | <0.20 | mg/L |
| Magnesium | <2.0 | mg/L |
| Mercury | <0.0016 | mg/L |
| Potassium | <2.0 | mg/L |
| Selenium | <0.40 | mg/L |

TABLE 1-continued

| Element | Amount | Units |
|---|---|---|
| Silicon | <4.0 | mg/L |
| Silver | 0.15 | mg/L |
| Zinc | 0.14 | mg/L |
| Aluminum | 95 | mg/kg |
| Boron | <500 | mg/kg |
| Manganese | <3540 | mg/kg |

The present material recovery process 10 recovers useful metal M and gases that may be recycled. The process 10 provides a sound environmental solution to waste treatment that protects the environment as well as public health. This goal is achieved by controlling the emission of toxic and/or flammable gases. The process 10 and its components may be sized for a particular installation or group of installations and may also be designed to be mobile. The process 10 may be controlled automatically or manually.

It is to be understood that the present invention is not limited to the embodiments described above, but encompasses any and all embodiments within the scope of the following claims.

I claim:

1. A process for recovering useful material from waste material, comprising the steps of:
   providing a quantity of waste material wherein said waste material comprises a mixture of oil, metal and organic compounds;
   placing the waste material into a slurry tank and adding water to the waste material to produce a mixable slurry;
   mixing the slurry produced in the previous step to evenly distribute the waste material throughout the slurry;
   recovering the metal from the waste material slurry using a magnetic separator;
   transferring the remaining waste material to an anaerobic reactor;
   adding sludge seed to the waste material in the anaerobic reactor, the sludge seed providing anaerobic organisms for reacting with the organic compounds of the waste material to produce recoverable inorganic gases; and
   transferring the recoverable inorganic gases to a storage vessel and compressing the inorganic gases leaving a residual waste material in the anaerobic reactor;
   whereby useful metal and gas are separated and recovered from the quantity of waste material.

2. The process according to claim 1, further comprising the step of transferring the residual waste material to a landfill.

3. The process according to claim 1, further comprising the step of transferring the compressed inorganic gas from the storage vessel to a turbine to produce electricity.

4. The process according to claim 1, wherein the magnetic separator comprises a magnetized belt that removes the metal from the waste material slurry and transfers the removed metal to a holding tank.

5. The process according to claim 1, wherein mixing comprises high energy mixing the waste material slurry at a rate greater than 100 rpm.

6. The process according to claim 1, wherein the waste material comprises a used cutting oil from a metal grinding machine, wherein the used cutting oil contains metal shavings produced by the metal grinding machine.

7. The process according to claim 6, wherein said metal grinding machine comprises a metal grinding machine.

8. The process according to claim 1, wherein the useful metal comprises metals selected from the group consisting of As, Ba, Cd, Ca, Cr, Cu, Fe, Pb, Mg, Hg, K, Se, Si, Ag, Zn, Al and B.

9. The process according to claim 1, wherein the recovered inorganic gases comprise gases selected from the group consisting of CH4, CO and CO2.

10. The process according to claim 1, further comprising the step of adding a second quantity of waste material into the anaerobic reactor.

11. The process according to claim 10, further comprising the step of transferring the waste material into a second slurry tank and mixing the waste material.

12. The process according to claim 10, further comprising the step of transferring the waste material from the second slurry tank to a second magnetic separator to recover additional metal from the waste material.

* * * * *